(12) United States Patent
Misawa et al.

(10) Patent No.: US 7,676,151 B2
(45) Date of Patent: Mar. 9, 2010

(54) FILM CARTRIDGE TYPE DIGITAL CAMERA

(75) Inventors: Takeshi Misawa, Saitama (JP); Kazuhiko Onda, Saitama (JP)

(73) Assignee: Fujifilm Corporation, Tokyo (JP)

( * ) Notice: Subject to any disclaimer, the term of this patent is extended or adjusted under 35 U.S.C. 154(b) by 635 days.

(21) Appl. No.: 11/529,577

(22) Filed: Sep. 29, 2006

(65) Prior Publication Data

US 2007/0077060 A1 Apr. 5, 2007

(30) Foreign Application Priority Data

Sep. 30, 2005 (JP) ............................. P.2005-288866

(51) Int. Cl.
*G03B 17/02* (2006.01)
*G03B 17/48* (2006.01)

(52) U.S. Cl. ...................... 396/429; 396/538
(58) Field of Classification Search ................. 312/9.1; 348/64; 354/335, 338, 340; 396/429, 518, 396/535, 538, 540
See application file for complete search history.

(56) References Cited

U.S. PATENT DOCUMENTS

| | | | | | |
|---|---|---|---|---|---|
| 2,484,225 | A | * | 10/1949 | Alfred | 264/138 |
| 4,249,815 | A | * | 2/1981 | Burkholder | 396/479 |
| 4,482,232 | A | * | 11/1984 | Engelsmann et al. | 396/514 |
| 4,634,071 | A | * | 1/1987 | Hertel | 242/348.4 |
| 4,730,778 | A | * | 3/1988 | Akao et al. | 242/588.5 |
| 5,271,983 | A | * | 12/1993 | Ise et al. | 428/92 |
| 5,282,040 | A | * | 1/1994 | Sapir | 348/220.1 |
| 5,308,009 | A | * | 5/1994 | Mizuno | 242/348.4 |
| 5,561,458 | A | * | 10/1996 | Cronin et al. | 348/64 |
| 5,619,257 | A | * | 4/1997 | Reele et al. | 348/64 |
| 6,091,907 | A | * | 7/2000 | Pagano | 396/207 |
| 6,181,883 | B1 | * | 1/2001 | Oswal | 396/429 |
| 6,351,282 | B1 | * | 2/2002 | DeLeeuw et al. | 348/231.99 |
| 6,370,339 | B1 | * | 4/2002 | Stern et al. | 396/429 |
| 6,652,166 | B2 | * | 11/2003 | Kawasaki et al. | 396/513 |
| 6,943,820 | B2 | * | 9/2005 | Schmidt | 348/64 |
| 7,214,921 | B2 | * | 5/2007 | Miyashita et al. | 250/208.1 |
| 2005/0205903 | A1 | * | 9/2005 | Hioki | 257/291 |
| 2006/0181629 | A1 | * | 8/2006 | Miyashita et al. | 348/311 |
| 2006/0186408 | A1 | * | 8/2006 | Misawa | 257/59 |
| 2007/0075389 | A1 | * | 4/2007 | Misawa | 257/440 |
| 2007/0076093 | A1 | * | 4/2007 | Misawa | 348/125 |
| 2007/0076108 | A1 | * | 4/2007 | Misawa | 348/294 |

FOREIGN PATENT DOCUMENTS

| | | |
|---|---|---|
| JP | 09-068752 | 3/1997 |
| JP | 09-098326 | 4/1997 |
| JP | 2000-115611 | 4/2000 |
| JP | 2000-184250 | 6/2000 |
| JP | 2003-234932 | 8/2003 |

* cited by examiner

*Primary Examiner*—Rodney E Fuller
(74) *Attorney, Agent, or Firm*—McGinn IP Law Group PLLC (57) ABSTRACT

A film cartridge type digital camera is provided and includes: a film cartridge type case having a compatible shape with a film cartridge into which a film camera is loaded; and an imaging device loaded into the film cartridge type case in a curved state.

20 Claims, 11 Drawing Sheets

CLOCKWISE (CW) VIEWED
FROM AXIS DIRECTION

| ITEM | CONTENTS |
|---|---|
| CARTRIDGE LOADING DIRECTION | REGULAR/INVERSE |
| WINDING METHOD | FORWORD DIRECTION/ REVERSE DIRECTION (PRE-WINDING) |
| SENSITIVITY | ISO xxx OR LIKE |

FILM CARTRIDGE TYPE DIGITAL CAMERA

BACKGROUND OF THE INVENTION

1. Field of the Invention

The present invention relates to a film cartridge type digital camera that can be used by loading into a film camera.

2. Description of Related Art

Nowadays, the film camera for taking a photograph on a silver film is not so often used on account of the notable spread of digital cameras. However, most of the cameras that have already been spread as the high-class single-lens reflex camera are the film cameras. Also, user's demands for utilization of the high-performance optical lens system, the AF function, the AE function, etc. of the film camera are still rising.

Figure 15A:
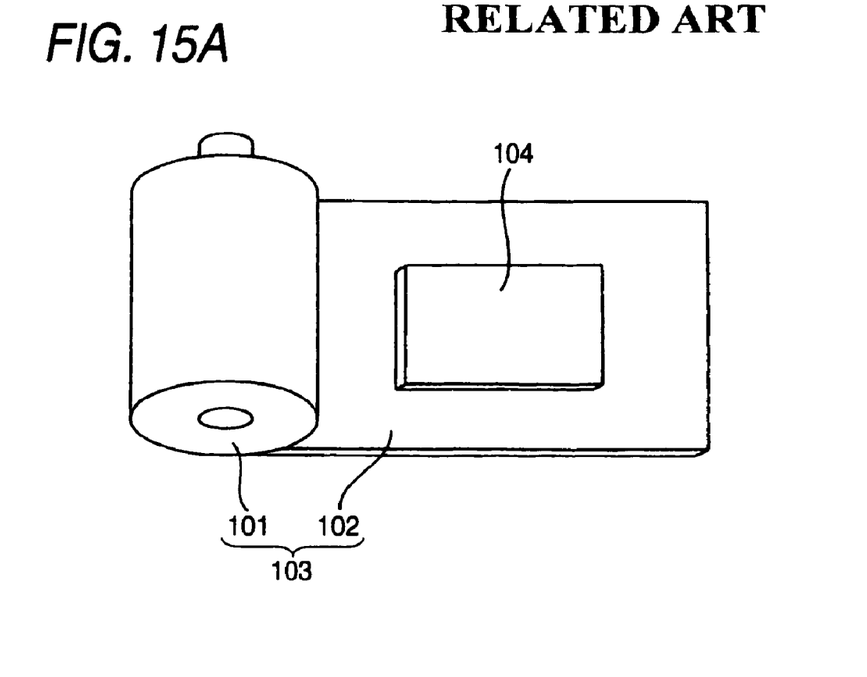
FIGS. 15A and 15B are explanatory views of a film cartridge type digital camera in the related art.

For this reason, as in JP-A-2000-115611, JP-A-9-98326, JP-A-2000-184250 and JP-A-2003-234932, the film cartridge type digital camera has been proposed. FIG. 15A is a view of an external appearance of the film cartridge type digital camera in the related art. This film cartridge type digital camera includes a case 103 that is constructed by coupling together a cartridge main body portion 101 having the same shape as a cartridge into which a film is installed, and a plate portion 102 formed to look like the film that is pulled out from the main body portion 101 by a length. A CCD or CMOS image sensor (imaging device) 104 manufactured on a semiconductor substrate is fitted onto the plate portion 102. Also, a processing portion for driving and/or controlling the image sensor 104 and processing the captured image data, and a battery are installed into the main body portion 101.

Figure 15B:
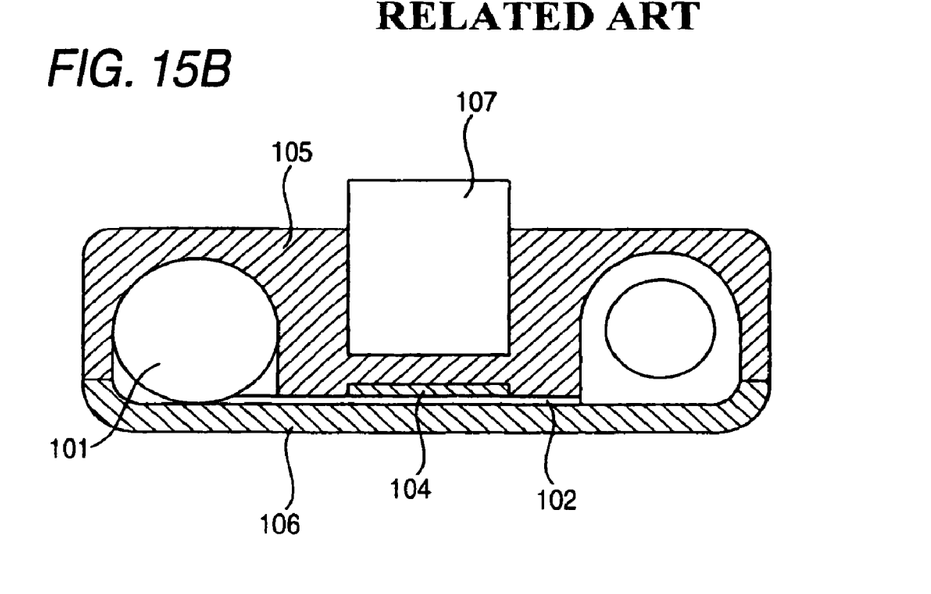

Then, when the user uses the film cartridge type digital camera, such user opens a back case 106 of a film camera 105 and then loads the main body portion 101 into a cartridge loading portion, as shown in FIG. 15B. Thus, the image sensor 104 is positioned on a focusing surface of an optical lens system 107 of the film camera 105, and then the user captures an image of an object.

In the film cartridge type digital camera in the related art, such a digital camera can be loaded only into the film camera whose back case can be opened. This is because the image sensor 104 is fixed to project outward from the cartridge main body portion 101 and thus such digital camera cannot be loaded into a drop-in type film camera such as a compact camera, an APS camera, or the like.

Also, the film cartridge type digital camera in the related art is kept in a state that a surface of the image sensor 104 is exposed in the film camera over a long time. Therefore, it is possible that the surface of the image sensor is contaminated with a dust, a waste, and the like generated in the film camera when a mechanical shutter and the like are operated many times. That is, there is a possibility that such film cartridge type digital camera cannot capture the good image during a long-term use.

SUMMARY OF THE INVENTION

An object of an illustrative, non-limiting embodiment of the present invention is to provide a film cartridge type digital camera that can be loaded in the type of film camera into which a film is put not to open a back case, and can capture an image on an imaging surface that is kept clean.

According to one aspect of the invention, there is provided a film cartridge type digital camera including: a film cartridge type case having a compatible shape with a film cartridge into which a film camera is loaded; and an imaging device loaded into the film cartridge type case in a curved state.

In one aspect of the invention, a signal processing unit for processing image data captured by the imaging device, and a memory for recording the captured image data processed by the signal processing unit are provided in the film cartridge type case.

In one aspect of the invention, a communicating unit for transmitting the captured image data to an outside of the camera is provided in the film cartridge type case.

In one aspect of the invention, the memory is a memory card provided detachably to the film cartridge type case.

In one aspect of the invention, an operation switch is provided to the film cartridge type case.

In one aspect of the present invention, the operation switch is a power supply switch.

In one aspect of the invention, the operation switch sets a regular/inverse state (i.e., a loading direction of the film cartridge type case) when the film cartridge type case is loaded into the film camera.

In one aspect of the invention, a cleaning mechanism for cleaning an imaging surface of the imaging device is provided to an opening of the film cartridge type case, through which the imaging device is taken in and out.

In one aspect of the invention, the cleaning mechanism is silicon rubber or implanted hairs.

In one aspect of the invention, the imaging device includes: a flexible sheet; a pixel electrode layer; an opposing electrode layer; a photosensitive layer between the pixel electrode layer and the opposing electrode layer; a signal reading unit to read a signal responding to an photoelectron generated by light entering into the photosensitive layer; and a flexibility enhancing unit for separating the photosensitive layer between pixels in a direction perpendicular to a sheet surface of the flexible sheet.

In one aspect of the invention, a the imaging device has a plurality of sets stacked, each of the sets including: the pixel electrode layer; the opposing electrode layer; and the photosensitive layer between the pixel electrode layer and the opposing electrode layer, and the photosensitive layer in one of the sets has a peak of a light receiving sensitivity in a wavelength range different from each photosensitive layer in the other of the sets.

In one aspect of the invention, the imaging device has three sets stacked, each of the three sets including: the pixel electrode layer; the opposing electrode layer; and the photosensitive layer between the pixel electrode layer and the opposing electrode layer, and a first one of the three sets has sensitivity to red-color light, a second one of the three sets has sensitivity to green-color light, and a third one of the three sets has sensitivity to blue-color light.

In one aspect of the invention, the curved state is a wound state (i.e., a state in which the imaging device is wound.)

In one aspect of the invention, a winding direction of the imaging device is set by the operation switch.

In one aspect of the invention, a winding shaft for winding the imaging device and a sheet material for supporting the imaging device in conjunction with a rotating mechanism of the film cartridge type case is provided in the film cartridge type case.

In one aspect of the invention, the shaft for winding the imaging device and the shaft for winding the sheet material are constructed by the same shaft.

In one aspect of the invention, the shaft for winding the imaging device and the shaft for winding the sheet material are different shafts from each other.

BRIEF DESCRIPTION OF THE DRAWINGS

The features of the invention will appear more fully upon consideration of the exemplary embodiments of the inventions, which are schematically set forth in the drawings, in which.

DETAILED DESCRIPTION OF THE EXEMPLARY EMBODIMENTS

Although the invention will be described below with reference to the exemplary embodiments thereof, the following exemplary embodiments and modifications do not restrict the invention.

According to exemplary embodiments, since a sheet-like imaging device having great flexibility is employed and this imaging device is wound like the conventional silver film and put in the film cartridge, such imaging device can be fitted to the drop-in type film camera. Also, since a clean imaging surface is pulled out from the film cartridge, or the like in shooting the object, such imaging device can capture a good image.

Exemplary embodiments of the present invention will be explained with reference to the drawings hereinafter.

Figure 1:
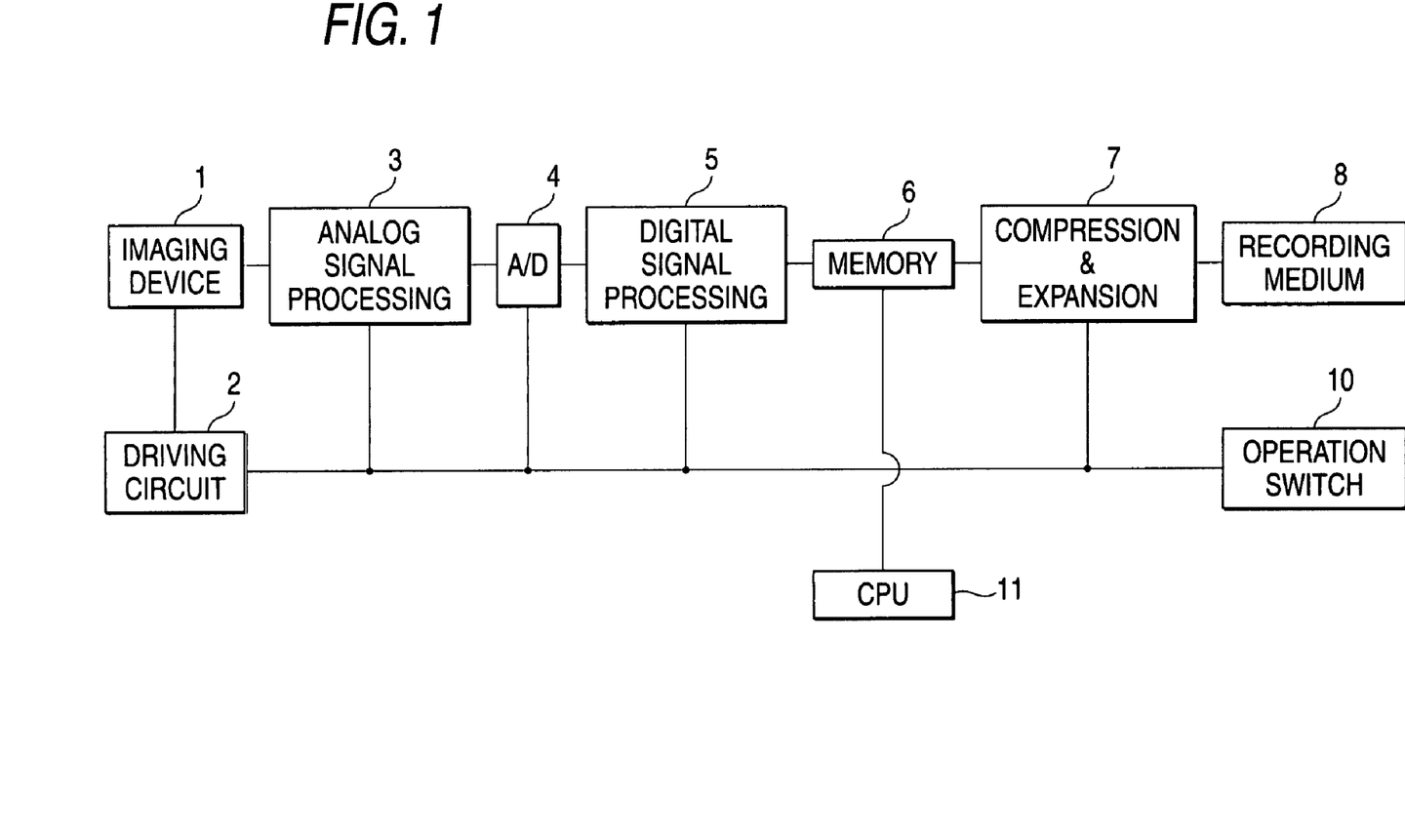
FIG. 1 is a block diagram of a digital camera using an imaging device according to an exemplary embodiment of the present invention.

FIG. 1 is a block diagram of a film cartridge type digital camera according to an exemplary embodiment of the present invention. This film cartridge type digital camera has a film cartridge type case having the same shape (compatible shape) as a film cartridge in which a silver film is contained, and is contained in the film cartridge type case.

An imaging device 1 manufactured windably, a driving circuit 2 for driving and/or controlling the imaging device 1, an analog signal processing circuit 3 for applying an analog process such as a correlated double sampling process, and the like to an image signal output from the imaging device 1, an A/D converter circuit 4 for converting an image signal, which has been subjected to the analog processes, into a digital signal, and a digital signal processing circuit 5 for applying digital signal processes such as gain correcting process, gamma correcting process, interpolating process, RGB/YC converting process, and the like to the image signal that has been converted into a digital signal are provided in the film cartridge type case.

Also, the film cartridge type digital camera of the present embodiment further includes a memory 6 for storing once captured image data output from the digital signal processing circuit 5, a compression and expansion circuit 7 for compressing the captured image data in the memory 6 into captured image data in JPEG format, or the like and expanding the captured image data to the original state, a recording medium 8 for storing the captured image data after the compression, an operation switch 10, and a CPU 11 for controlling the overall digital camera. Here, the image compression can be omitted as occasion demands.

The recording medium 8 may be a memory that is fixed and/or arranged in the film cartridge type case. Preferably the recording medium 8 should be a small-sized memory card that can be inserted detachably into the film cartridge type case. Also, a battery for supplying a power to respective constituent members of the digital camera is installed into the film cartridge type case. Preferably this battery should be detachably attached and exchanged.

Unlike the ordinary digital camera, the digital camera shown in FIG. 1 is not equipped with a display used to check the captured image. But a small-sized display may be fitted to the film cartridge type case. Otherwise, the image data in the memory 6 may be transmitted via radio and then displayed on the display provided separately on the outside of the film camera.

Figure 2:
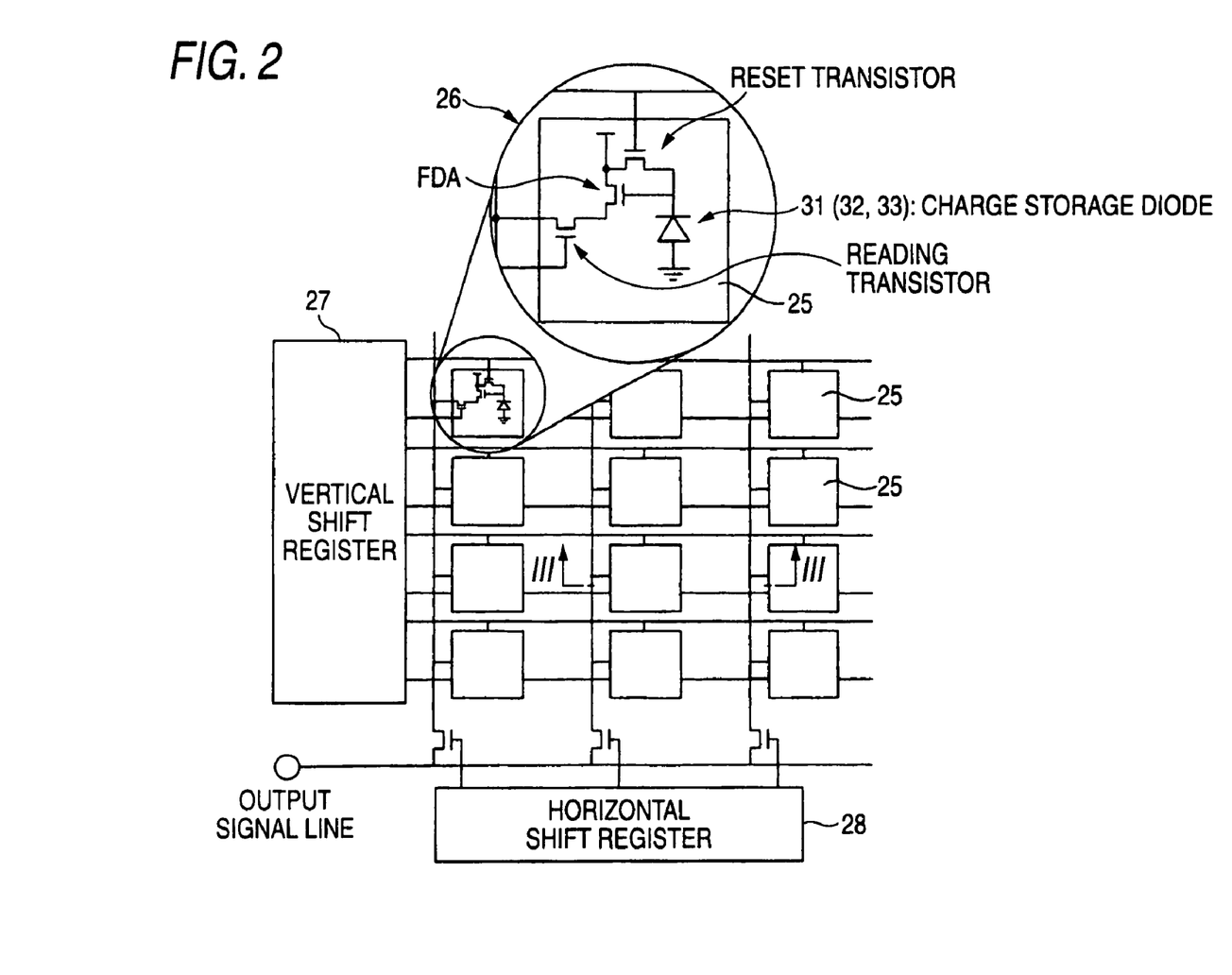
FIG. 2 is a schematic view of an imaging device shown in FIG. 1, a part of which is shown in an enlarged unpackaged manner.

FIG. 2 is a schematic view of an imaging device shown in FIG. 1, a part of which is shown in an enlarged unpackaged manner. In an illustrated example, a large number of pixels 25 are aligned and/or formed on a surface of the imaging device 1 in a square matrix fashion. A signal reading circuit 26 for reading the image signal R (red), G (green), B (blue) responding to the R, G, B signal charge sensed by each pixel 25 is formed on the bottom portion of each pixel 25.

In the present embodiment, the signal reading circuit having a three-transistor configuration used in the CMOS image sensor is illustrated as an example of the signal reading circuit 26. But the signal reading circuit having a four-transistor configuration may also be employed. Three signal reading circuits 26 are provided every pixel, and each signal reading circuit 26 outputs the R, G, B sensed signal to the analog signal processing circuit 3 (FIG. 1) when it is designated by a vertical shift register 27 and a horizontal shift register 28.

Figure 3:
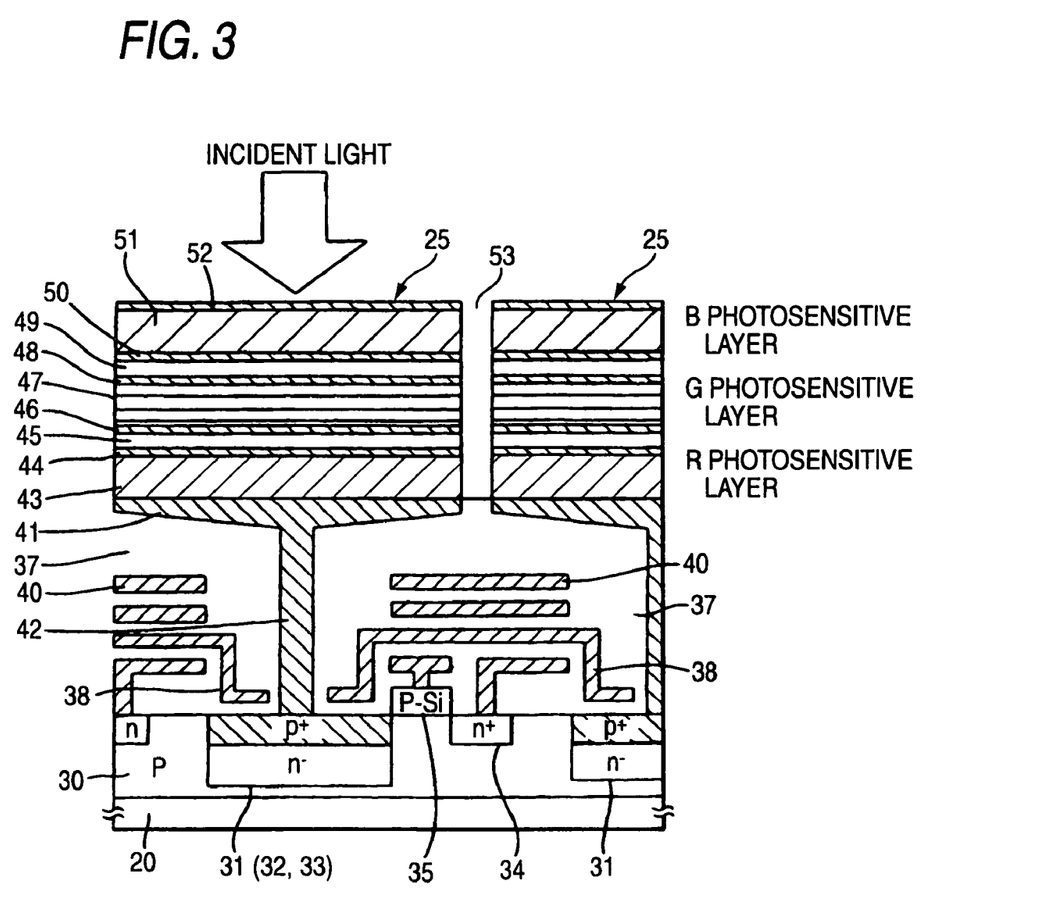
FIG. 3 is a schematic sectional view taken along a III-III line in FIG. 2.

FIGS. 3A and 3B are schematic sectional views taken along a III-III line in FIG. 2, which is equivalent to a section of almost 1.5 pixel. A p-type semiconductor layer 30 is formed on a surface of a flexible sheet 20 that is formed by shaping the material such as polyethylene terephthalate (PET), or the like into a sheet-like form. Then, diode portions described hereunder and the signal reading circuits 26 are formed on the semiconductor layer 30 by using the technology to manufacture the TFT matrix, etc. on the liquid crystal substrate or the technology to manufacture the organic EL device, as set forth in JP-A-5-158070, for example.

First, diode portions 31 serving as red-color (R) signal charge storage areas are formed in locations on a surface of the semiconductor layer 30. Also, diode portions (32) serving as green-color (G) signal charge storage areas are formed on the hind side of the diode portions 31 of a sheet. Also, diode portions (33) serving as blue-color (B) signal charge storage areas are formed on the further hind side of the diode portions 31 of a sheet.

Also, $n^+$-regions 34 each constituting a part of transistors of the signal reading circuit 26 are formed on a surface portion of the semiconductor layer 30. When a reading voltage is applied to a gate electrode 35 provided via a surface oxide layer (not shown) of the semiconductor layer 30, storage charges in the diode portion 31 are drifted to the $n^+$-region 34 and then are read to the outside of the imaging device 1 by the signal reading circuit 26.

As the signal reading circuit 26, an R signal reading circuit for reading the storage charges in the diode portion 31, a G signal reading circuit for reading the storage charges in the diode portion 32, and a B signal reading circuit for reading the storage charges in the diode portion 33 are provided every one pixel. These signal reading circuits 26 are shielded from a light by a light shielding layer 38 buried in an insulating layer 37 that is stacked on the surface of the semiconductor layer 30. A metal wiring 40 connects each pixel 25 to the vertical shift register 27 or the horizontal shift register 28.

Then, R pixel electrode layers 41 are formed on a surface of the insulating layer 37, and vertical wirings 42 for connecting the R pixel electrode layer 41 and the R diode portion 31 respectively are provided upright. Then, a photosensitive layer (photoelectric converting layer) 43 that has sensitivity to a red-color light is formed on the R pixel electrode layers 41, and then a transparent opposing electrode layer 44 is formed on the photosensitive layers 43.

Then, a transparent insulating layer 45 is formed on the opposing electrode layer 44, and then a transparent G pixel electrode layer 46 is formed thereon. The vertical wirings (on the hind side of the vertical wirings 42 of a sheet) for connecting the G pixel electrode layer 46 and the G diode portion 32 respectively are provided upright. Then, a photosensitive layer (photoelectric converting layer) 47 that has sensitivity to a green-color light is formed on the G pixel electrode layer 46, and a transparent opposing electrode layer 48 is formed thereon.

Then, a transparent insulating layer 49 is formed on the opposing electrode layer 48, and a transparent B pixel electrode layer 50 is formed thereon. The vertical wirings (on the further hind side of the vertical wirings 42 of a sheet) for connecting the B pixel electrode layer 50 and the B diode portion 33 respectively are provided upright. Then, a photosensitive layer (photoelectric converting layer) 51 that has sensitivity to a blue-color light is formed on the B pixel electrode layer 50, and a transparent opposing electrode layer 52 is formed thereon.

The R vertical wirings 42, the G vertical wirings, and the B vertical wirings connect the corresponding diode portion and the pixel electrode layer respectively, and are isolated electrically from other members. Also, a transparent protection layer (not shown in FIG. 3) is formed on the opposing electrode layer 52.

Figure 4:
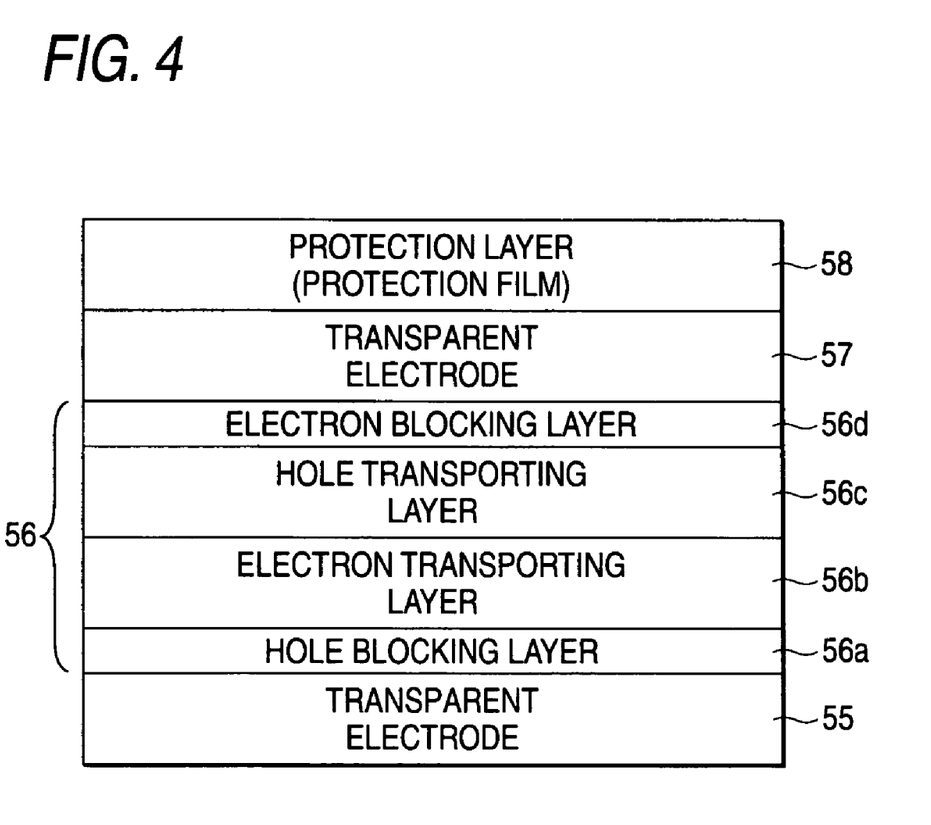
FIG. 4 is an explanatory view of a photosensitive layer (photoelectric converting layer) stacked type imaging device.

In FIG. 3, the structure in which the photosensitive layer is put between the transparent electrode layers (the pixel electrode layer, the opposing electrode layer) respectively is explained. Alternately, a laminated structure shown in FIG. 4 is recommended. A photosensitive layer 56 is formed on a transparent pixel electrode layer 55, then a transparent opposing electrode layer 57 is formed thereon, and then a transparent protection layer 58 is formed thereon (provided only on the uppermost opposing electrode layer 52 in the three-layered structure in FIG. 3).

In the illustrated example, the photosensitive layer 56 is constructed by a hole blocking layer 56a formed on the transparent pixel electrode layer 55, an electron transporting layer 56b formed thereon, a hole transporting layer 56c formed thereon, and an electron blocking layer 56d formed thereon.

When light is incident on such imaging device 1 from the object, light in a blue-color wavelength range of the incident light is absorbed by the B photosensitive layer 51, and then hole-electron pairs are generated in response to a quantity of absorbed light. Then, the electrons out of the hole-electron pairs flow into the B diode portion 33 from the B pixel electrode layer 50 through the vertical wiring, and stored in the B diode portion 33.

Similarly, light in a green-color wavelength range of the incident light is absorbed by the G photosensitive layer 47, and then the hole-electron pairs are generated in response to a quantity of absorbed light. Then, the electrons out of the hole-electron pairs flow into the G diode portion 32 from the G pixel electrode layer 46 through the vertical wiring, and stored in the G diode portion 32.

Similarly, light in a red-color wavelength range of the incident light is absorbed by the R photosensitive layer 43, and then the hole-electron pairs are generated in response to a quantity of absorbed light. Then, the electrons out of the hole-electron pairs flow into the R diode portion 31 from the R pixel electrode layer 41 through the vertical wiring 42, and stored in the R diode portion 31.

When a reading voltage is applied to the gate electrode 35, the storage charges in these diode portions 31, 32, 33 are drifted to the $n^+$-region 34, and then read to the outside of the imaging device by the signal reading circuit 26 to output to the analog signal processing circuit 3 in FIG. 1.

As described above, since the imaging device 1 of the present embodiment is formed on the flexible substrate 20, such imaging device can be wound. In this case, when a radius of curvature of the wound imaging device 1 is small, a difference of curvature between the light receiving surface and the back surface of the flexible substrate 20 is increased and thus a stress applied to the photosensitive layers, the electrode layers, and the like is increased.

Therefore, in the present embodiment, a flexibility enhancing portion for separating the photosensitive layer, which is sandwiched between the pixel electrode layer and the opposing electrode layer, between the pixels provided at appropriate locations in the direction perpendicular to a sheet surface of the flexible substrate 20 is provided. In the illustrated example in FIG. 3, the pixels are separated one pixel by one pixel by a clearance (space) 53 to show more flexibility. Accordingly, when the imaging device 1 is pasted onto the sheet material like the conventional film and then wound, such imaging device 1 can be loaded in the film cartridge containing the conventional film therein.

In this case, the clearance 53 serving as the flexibility enhancing portion may be provided to the positions to separate the pixels not one pixel by one pixel but plural pixels by plural pixels. Because the clearance 53 is provided to enhance an amount of flexibility in the winding direction of the imaging device 1, a necessity of providing the clearance 53 to separate the pixels in the direction perpendicular to the winding shaft is low. The clearance 53 may be provided as an air clearance as it is, or elastic rubber, high molecular compound, or the like may be filled in the clearance 53.

Figure 5A:
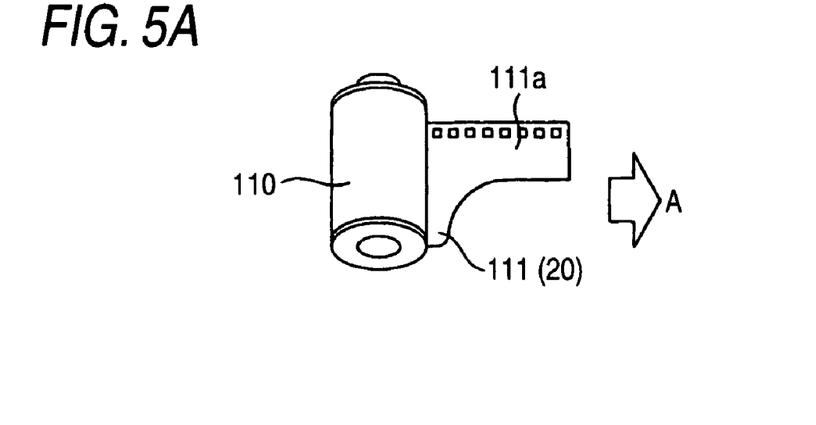
FIGS. 5A to 5C are explanatory views of a film cartridge type digital camera using the imaging device shown in FIG. 3.
Figure 5B:
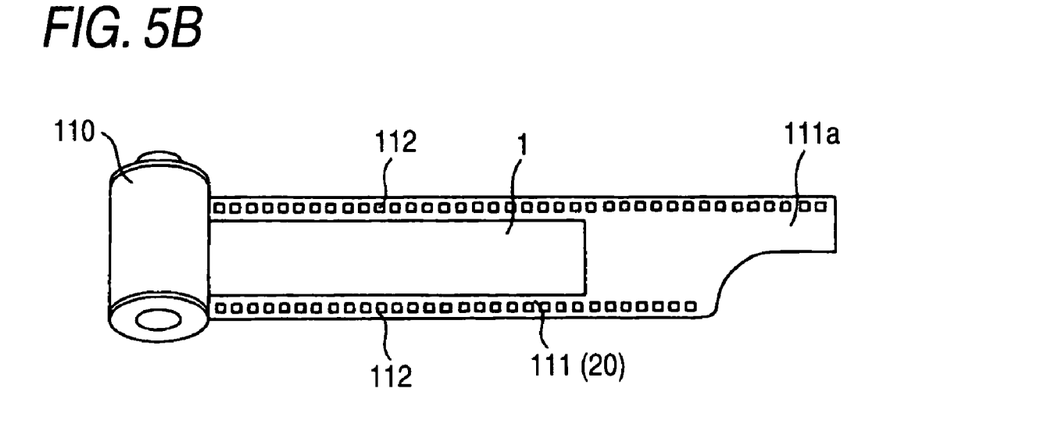
Figure 5C:
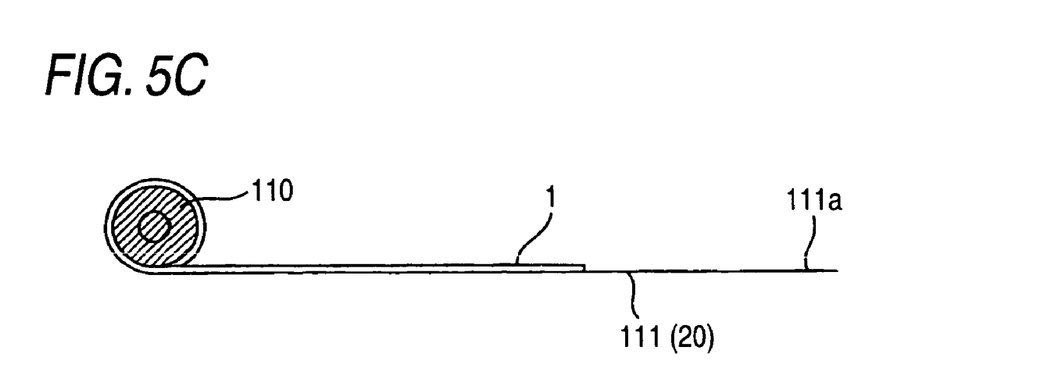

When the film cartridge type case in which such imaging device 1 is housed is loaded into the film camera, a tongue portion 111*a* of a sheet material 111 is pulled out from a film cartridge type case 110 in the direction indicated with an arrow A, as shown in FIG. 5A. Thus, the imaging device 1 pasted on the sheet material 111 can be pulled out from the film cartridge type case 110, as shown in FIGS. 5B and 5C. The flexible substrate 20 explained in FIG. 3 may be used as the sheet material 111 itself, and the imaging device may be formed on the sheet material 111.

A length of the imaging device 1 is set to the same extent as a length of a 36-exposure silver film, for example. Then, 36 images may be captured on different imaging surfaces while feeding the sheet material 111 every one shot. For this purpose, perforations 112 are provided to an upper edge and a lower edge of the sheet material 111 like the silver film such that the sheet material 111 can be fed by a film feeding mechanism of the film camera. Here, explanation is made of the "36"-exposure imaging device as an example, but the number of exposures of the imaging device may be set arbitrarily. This is true of the following explanation.

In this manner, the film cartridge type digital camera of the present embodiment is constructed to have the same type as the silver film, and is applicable to the drop-in film camera in addition to the type of digital camera into which the film is loaded by opening the back case.

In the imaging device 1 of the embodiment described above, the signal reading circuits composed of the transistors are provided in the semiconductor layer 30. Such a configuration can be employed that, like the CCD image sensor, the registers constituting the vertical transferring paths and the horizontal transferring paths are formed in place of the signal reading circuits to read the storage charges in the diode portions 31, 32, 33.

The film cartridge type digital camera according to the present embodiment decides an image acquiring range by sensing an amount of feed of the imaging device 1 from the film cartridge type case 110 (an amount of winding in the case where the imaging device is loaded into a pre-winding type film camera).

Since the imaging device 1 of the present embodiment has the almost same length as the 36-exposure film, a useless process of reading the captured image data from all pixels of the imaging device 1 must be made frequently every time when the use takes one shot of the object. Therefore, if the image captured at this time is the image on the 4-th exposure, for example, the image signal is read only from the imaging surface on the 4-th exposure (image acquiring range) out of the imaging surfaces of the longitudinal imaging device.

As the method of sensing an amount of winding, there are the method of calculating an amount of winding by an optical, magnetic, or the like thickness sensing unit provided to the rotating shaft based on a total thickness of the imaging device 1 left still in the film cartridge type case 110, the method of sensing an amount of winding based on the number of perforations used to feed the imaging device 1, and the method of sensing an amount of feeding of the imaging device 1 by using a roller, or the like. These methods may be applied in combination to improve a sensing precision.

It is the perforation system that is easy to sense and calculation. When the number of perforations is counted by reading a difference in reflectance between the portion where the imaging device 1 is not formed and the hole portion of the sheet material 111, an amount of feeding of the imaging device 1 can be calculated based on a perforation interval known in advance.

In order to sense an amount of rotation of the center shaft, there is the method of using a combination of a rotary encoder (slit circular disk) fitted to the same shaft as the center shaft and a photodiode. A configurative example of a rotating amount sensing unit to execute this method is shown in FIG. 6A.

Figure 6A:
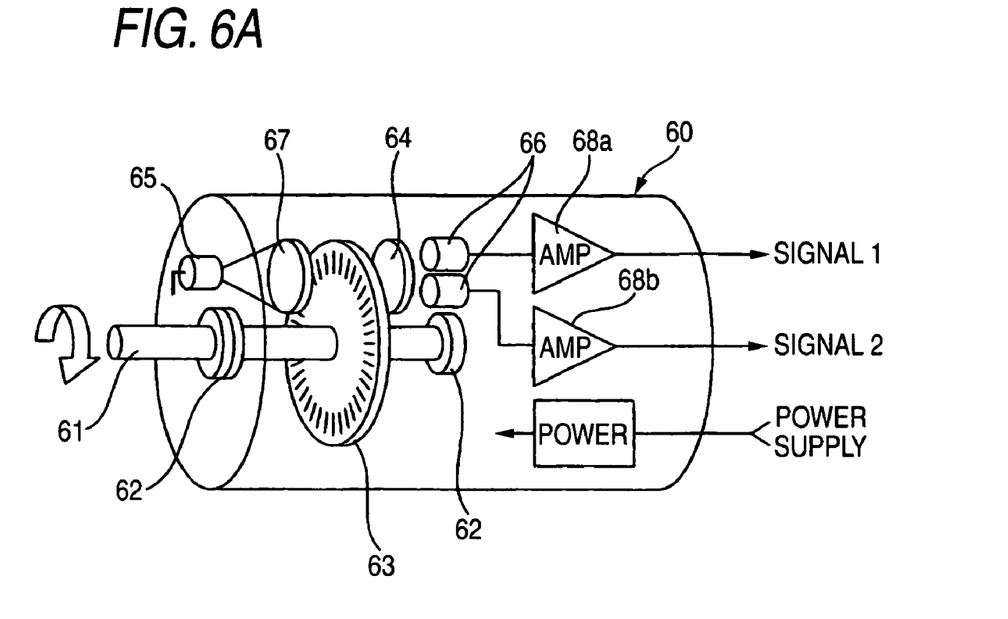
FIGS. 6A and 6B are explanatory views of a rotating amount sensing unit provided to the film cartridge type digital camera according to an exemplary embodiment of the present invention.

In a rotating amount sensing unit 60 shown in FIG. 6A, a center shaft 61, which is provided to the film cartridge type case 110 (FIGS. 5A to 5C) and on which the longitudinal sheet-like imaging device 1 is wound, is supported rotatably by bearings 62. A slit circular disk 63 on which a lattice scale mark is made at an equal interval is fitted to the center shaft 61. A fixed slit 64 on which the scale mark is made at the same interval is fixed/positioned to oppose to the slit circular disk 63.

Figure 6B:
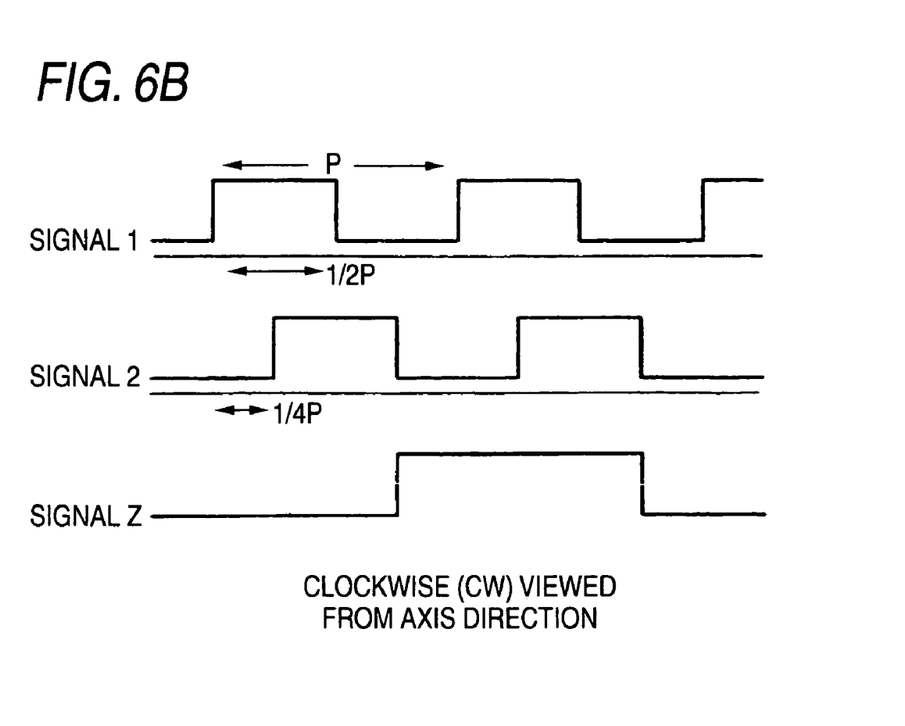

A light emitting device (light emitting diode) 65 and light receiving devices (photodiodes) 66 are provided to sandwich two slits 63, 64 therebetween. A light emitted from the light emitting device 65 is focused by a lens 67 and then irradiated onto the slit circular disk 63. An optical path is cut off every one pitch of the slit while the slit circular disk 63 is rotated, and thus the light receiving devices 66 receive the light and dark light in the number of times that is in proportion to an amount of rotation. Then, each of the light receiving devices 66 outputs this light and dark pattern as an electric signal, and then rectangular pulses (signal 1, signal 2) that have been subjected to the waveform shaping, as shown in FIG. 6B, are output from amplifiers 68*a*, 68*b* respectively.

The output signals (signal 1, signal 2) of the normal rotating amount sensing unit (rotary encoder) are a two-phase signal whose phases are adjusted to shift a ¼ pitch mutually. When the rotating direction of the unit is inverted, these phases are also inverted. Thus, when a reversible counter having a direction discriminator circuit therein is used together, an amount of rotation can be added and/or subtracted. In FIGS. 6A and 6B, two photodiodes 66 are used to sense the rotating direction. But only one photodiode may be used when it is not needed to sense the direction.

Figure 7A:
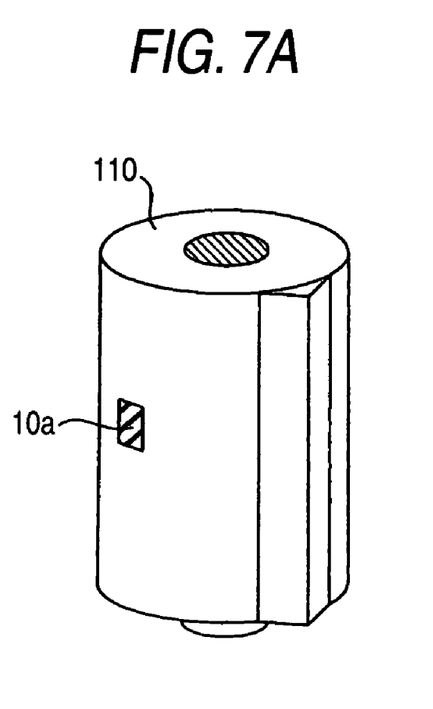
FIGS. 7A and 7B are views showing an external appearance of the film cartridge type digital camera according to an exemplary embodiment of the present invention.
Figure 7B:
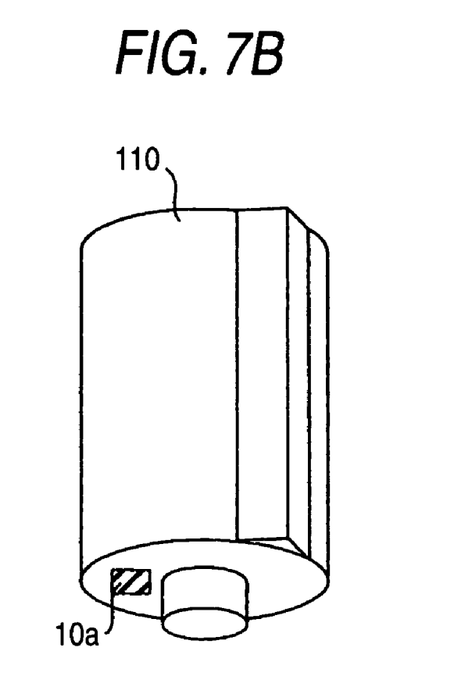

In the case of the film cartridge type digital camera, a power supply of the film cartridge type digital camera itself must be turned ON before this digital camera is loaded into the film camera. The power supply switch 10*a* (one of the operation switches shown in FIG. 1) can be provided to a side surface of the film cartridge type case 110, as shown in FIG. 7A, or the power supply switch 10*a* can be provided to a bottom surface of the film cartridge type case 110, as shown in FIG. 7B.

Figure 8:
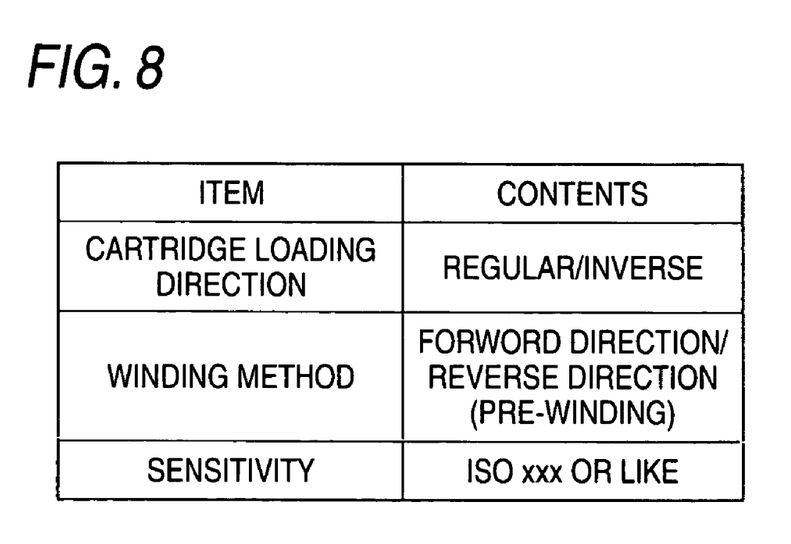
FIG. 8 is an explanatory view of set items of the film cartridge type digital camera according to an exemplary embodiment of the present invention.

When various settings are applied to the film cartridge type digital camera, the operation switch used for various settings is required of the film cartridge type case 110. The film cartridge type digital camera of the present embodiment is of the full film compatible type. It is desirable that items shown in FIG. 8, e.g., "film cartridge loading direction", "winding method", and "sensitivity" should be set.

The "film cartridge loading direction" signifies the direction in which the film cartridge is loaded into the film camera (regular or inverse). The direction in which the film cartridge is loaded into the film camera is not always decided. There are some film cameras into which the film cartridge is loaded in an erected state and the others into which the film cartridge is loaded in an inverted state. When the digital image is captured by the film cartridge type digital camera loaded into the film camera, it does not a matter which one of regular/inverse directions is chosen. However, upon viewing the recorded digital image, it is preferable for the user to know the loading direction depending on the image. Therefore, it is preferable that the regular or inverse direction can be set beforehand. A sensing device may be provided to the inside of the film cartridge type digital camera, and then a method of setting automatically this item may be employed.

The "winding direction" signifies the direction along which the imaging device 1 is wound every exposure. The ordinary film camera shoots a photograph by pulling out the film by one exposure from the film cartridge. Depending on the film camera, at first the film is pulled out completely from the film cartridge and wound on the opposite side (pre-winding), and then the film is rewound into the film cartridge by one exposure in every shooting.

The film cartridge type digital camera of the present embodiment can be employed in any film camera. But this "winding direction" is needed to decide from which area (the above image acquiring range) of the imaging device 1 the image data should be read. This item can be automatically set depending on the first operation after the power supply is turned ON (whether or not the film should be pulled out continuously).

It is preferable that the "sensitivity" can be set similarly to the ordinary film. The setting of this sensitivity can be changed by either changing an applied voltage to the photosensitive layer explained in FIG. 3 or changing a gain of the reading amplifier, or the like. Although this setting can be completely automated, some users desire the manual setting. Also, since the sensitivity is changed when the materials constituting respective photosensitive layers shown in FIG. 3 are changed, the sensitivity becomes different every imaging device. For this reason, it would be better that the sensitivity can be set.

When there are many items that are set by the operation switch, it is difficult to mount all operation switches on the small film cartridge type case 110. Therefore, as shown in FIG. 9A, a small-sized display device 15 may be provided on the side surface of the film cartridge type case 110, then the displayed item may be selected by a selecting switch 10*b*, and then may be set by a setting switch 10*c*.

In most of the film cameras, a window is provided to the camera case such that the type of loaded film can be checked from the outside of the camera, and thus the user can see the "film type" written on the side portion of the film cartridge through this window. Therefore, if the display device 15 is provided in this position that the user can see through the window, convenience of the film cartridge type digital camera in use can be improved.

Figure 9A:
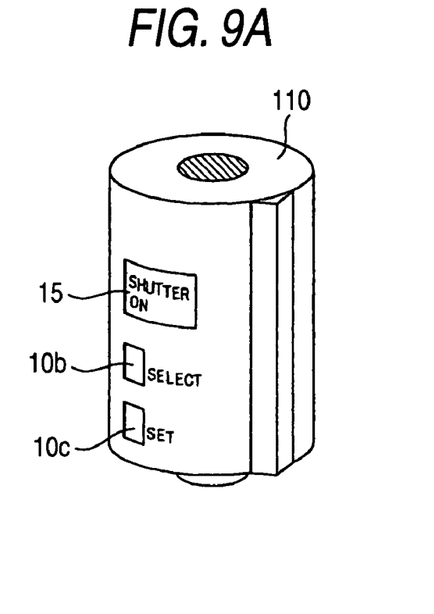
FIGS. 9A and 9B are views showing an external appearance of a film cartridge type digital camera according to another exemplary embodiment of the present invention.
Figure 9B:
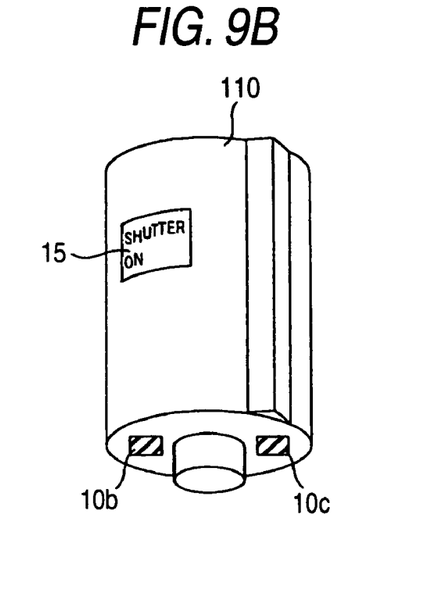

In FIG. 9A, the selecting switch 10*b* and the setting switch 10*c* are provided to the rear surface of the film cartridge type case 110. But there are some cameras through the bottom surface of which the film cartridge is loaded or unloaded. Therefore, as shown in FIG. 9B, it is desirable that the switches 10*b*, 10*c* having the same function should be provided to the bottom surface of the film cartridge type case 110 in addition to the rear surface. If a single film cartridge type digital camera cannot be used as both types, preferably the film cartridge type digital camera of both types may be provided.

Figure 10:
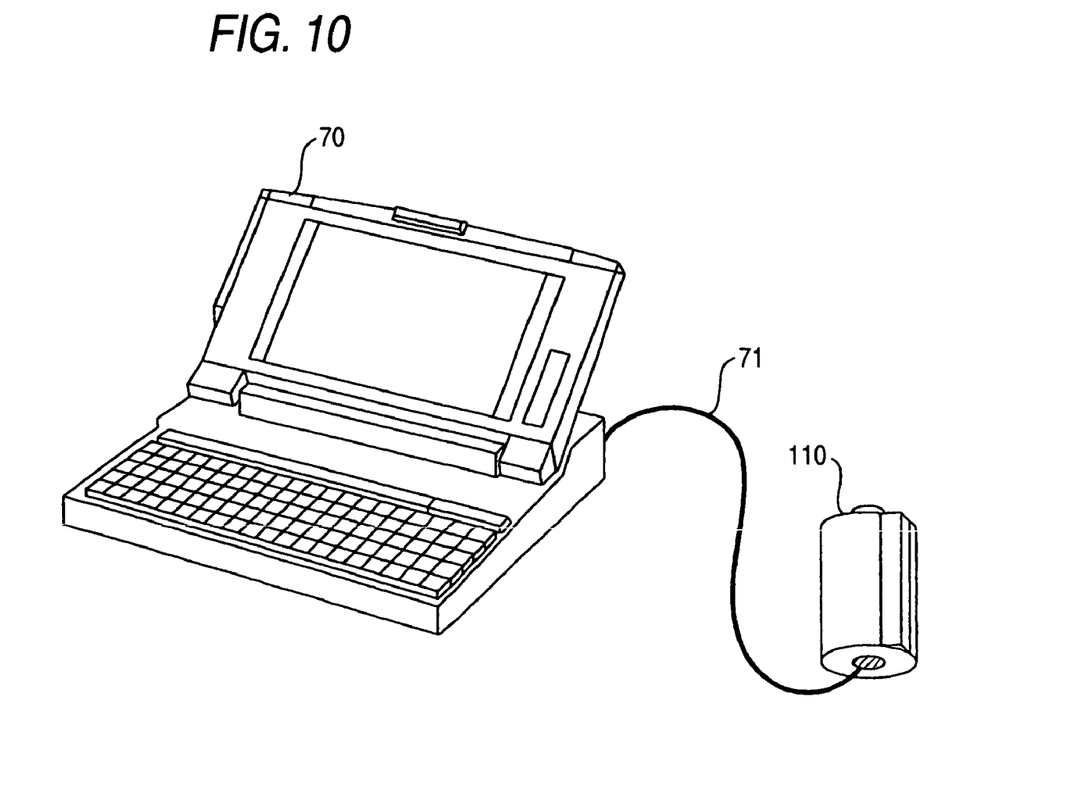
FIG. 10 is a view showing a situation that the film cartridge type digital camera according to an exemplary embodiment of the present invention is connected to a personal computer by using a communicating unit.

If there are further many setting items, it is troublesome to set these items merely by the switches. Also, since an empty space of the film cartridge type case 110 is small, a large number of switches cannot be provided. Therefore, if a communication function is provided to the film cartridge type digital camera, the user can set various items by using a personal computer 70 and a communication terminal, as shown in FIG. 10. As a result, the operation can be made simply. In an illustrated example, the personal computer 70 and the film cartridge type digital camera (film cartridge type case 110) are connected by using a communication cable 71. In this case, such a configuration may be employed that both devices are connected via radio or infrared communication.

If a function of learning the sensing of the set items is provided to the film cartridge type digital camera, there is no necessity that the user should set respective items one by one and thus convenience in use can be improved. As the learning method, a learning switch is provided to the film cartridge type case 110, then the film cartridge type digital camera is brought into its shooting state by pressing the power supply switch 10*a* after this leaning switch is turned ON, and then a shooting operation is executed once or several times to learn the items. Since the learned result can be displayed on the display device 15 when the learning switch is pressed once again, it can be checked whether or not the set items have been truly learned. Also, the learned result can be indicated not by the display device 15 but by a speaker, a buzzer, or the like.

The film cartridge type digital camera of the above embodiment is constructed such that a length of the imaging device 1 is set to the same extent as a length of the 36-exposure silver film, for example, and then the imaging device 1 is fed by one exposure every one shot. According to this configuration, a length of the imaging device 1 is increased, a production cost required for the imaging device of the film cartridge type digital camera is increased.

Figure 11A:
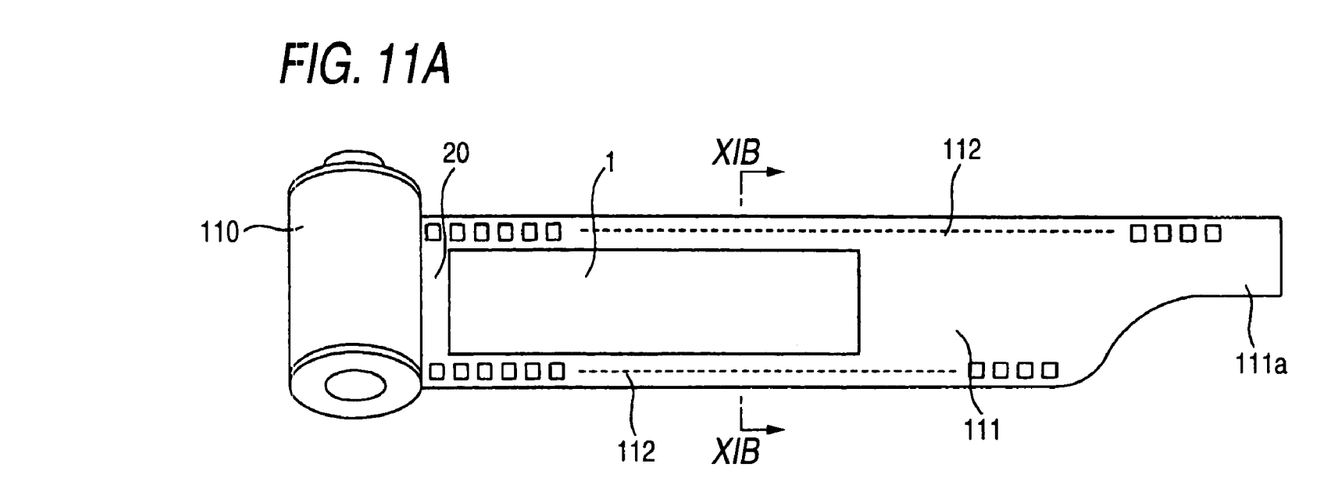
FIGS. 11A to 11C are explanatory views of a film cartridge type digital camera according to another exemplary embodiment of the present invention.
Figure 11B:
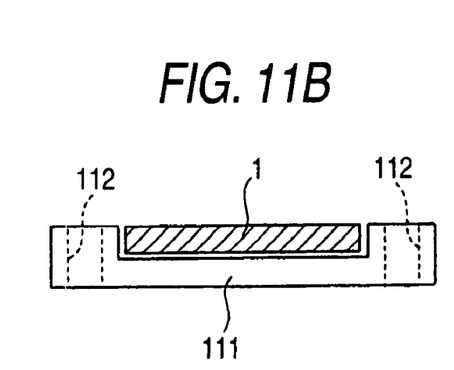
Figure 11C:
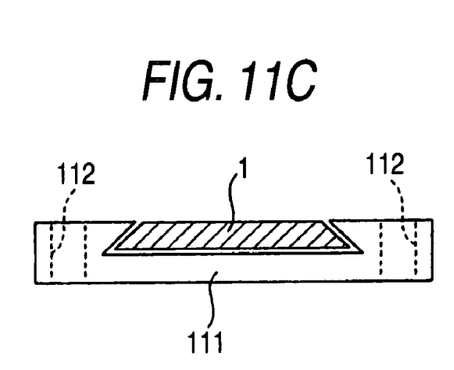

Therefore, a length of the imaging device 1 is reduced shorter than the sheet material 111 whose length is set to the same extent as a length of the 36-exposure silver film, as shown in FIG. 11A, and then the imaging device 1 is fitted slidably into the sheet material 111, as shown in FIG. 11B. As this fitting structure, a structure to prevent the imaging device 1 from being released from the sheet material 111 may be employed, as shown in FIG. 11C.

In this manner, in the embodiment in which the sheet material 111 and the imaging device 1 are provided slidably, the sheet material 111 and the imaging device 1 should be wound separately in the film cartridge type case 110. For example, shown in FIG. 12, a sheet material winding shaft 75 and an imaging device winding shaft 76 are provided in the film cartridge type case 110, and also the sheet material 111 is wound around the winding shaft 75 and the imaging device 1 is wound around the winding shaft 76 of the film cartridge type case 110.

Accordingly, the film camera winds up the sheet material 111 as the film, and then a further feeding of the imaging device 1 can be prevented after the imaging surface of the imaging device 1 as well as the sheet material 111 is fed up to the focusing position of the film camera.

Figure 12:
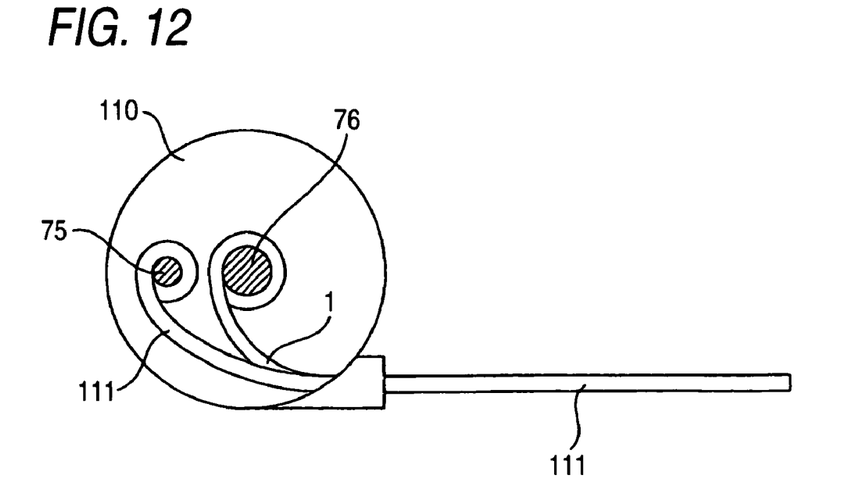
FIG. 12 is an explanatory view of a winding structure in the film cartridge type digital camera of the embodiment shown in FIG. 11.
Figure 13:
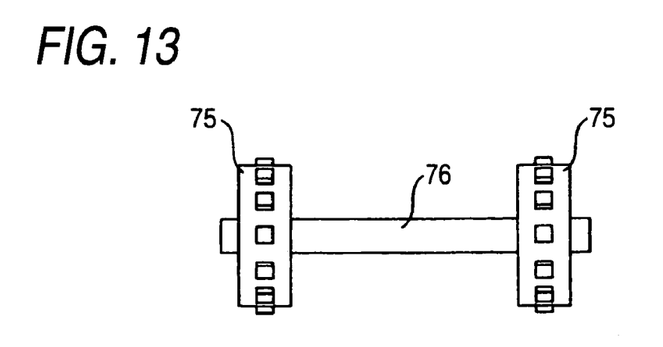
FIG. 13 is a view showing a winding shaft used in another winding structure in the film cartridge type digital camera of the embodiment shown in FIG. 11.

In FIG. 12, the sheet material winding shaft 75 for the sheet material 111 and the imaging device winding shaft 76 for the imaging device 1 are provided as the separate shafts. But the same shaft can be used as theses shafts. Such shaft is shown in FIG. 13. In this same shaft structure, the winding shafts 75 on which the sheet material 111 is wound are formed on both sides to have a large diameter, and the center winding shaft 76 on which the imaging device 1 is wound is formed to have a small diameter. Accordingly, a length of the imaging device 1 can be set short rather than the sheet material 111.

In the embodiments shown in FIG. 12 and FIG. 13, it is preferable that a fitting structure from which the sheet material 111 and the imaging device 1 can be separated easily should be employed to wind separately the sheet material 111 and the imaging device 1. There is no problem in the structure shown in FIG. 11B, but an improvement must be introduced into the structure shown in FIG. 11C.

Therefore, a shape of the fitting hole provided to the sheet material 111 is formed like a shape of the sheet material 111 shown in FIG. 11C over a full length. Also, a sectional shape of only a portion of the imaging device 1, which is shorter than the sheet material 111 in the widthwise direction, is formed as a trapezoid shape, as shown in FIG. 11C, and is fitted into the sheet material 111, while a portion from the sheet material winding shaft 75 to the imaging device 1 (portion where the imaging device 1 is not formed but only the flexible substrate 20 is formed) is formed to have a sectional shape indicated by a reference "1" FIG. 11B. Accordingly, the imaging device 1 is never released from the sheet material 111, while a portion of the flexible substrate 20 to be wound can be released easily from the sheet material 111.

Unlike the silver film, it is not needed to shield an exit of the film cartridge type case 110 of the film cartridge type digital camera in the above embodiment from a light. However, when a dust, and the like is adhered on the imaging surface upon shooting a photograph on the pulled-out imaging device 1, such dust, and the like is also inadvertently captured. This inadvertent appearance of the dust, and the like deteriorates significantly a picture quality of the captured image.

Figure 14A:
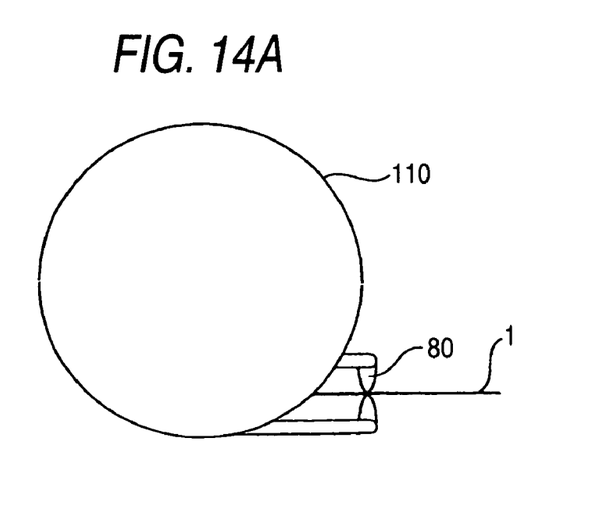
FIGS. 14A and 14B are explanatory views of a brush provided to a cartridge exit portion of the film cartridge type digital camera according to an exemplary embodiment of the present invention.
Figure 14B:
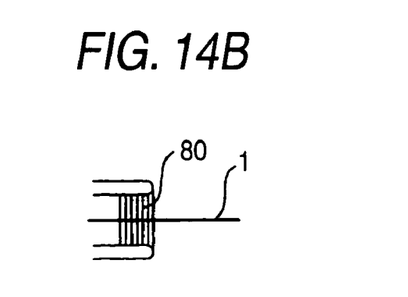

Therefore, like the film cartridge, as shown in FIG. 14A, a cleaning brush 80 made of silicon rubber, or the like may be implanted to the exit of the film cartridge type case 110 such that, when the imaging device 1 is pulled out, the imaging surface can be cleaned. This cleaning brush 80 can be formed in any shape, and may be formed like a brush, as shown in FIG. 14B.

In the above embodiment, the imaging device is wound like the silver film and loaded in the film cartridge type case. Since the imaging device of the present embodiment is the imaging device having flexibility, such imaging device can be loaded into the film cartridge type case in its folded state.

A film cartridge type digital camera according to an exemplary embodiment of the present invention is constructed such that the imaging device can be deflected largely is wound like the film and loaded into the film cartridge and then such imaging device is pulled out to capture the image. Therefore, this film cartridge type digital camera is useful to the digital camera that is loaded into the film camera to capture the image.

While the invention has been described with reference to the exemplary embodiments, the technical scope of the invention is not restricted to the description of the exemplary embodiments. It is apparent to the skilled in the art that various changes or improvements can be made. It is apparent from the description of claims that the changed or improved configurations can also be included in the technical scope of the invention.

This application claims foreign priority from Japanese Patent Application No. 2005-288866, filed Sep. 30, 2005, the entire disclosure of which is herein incorporated by reference.

What is claimed is:

1. A digital camera comprising:
   a case having a compatible shape with a film cartridge, and into which a film camera is loaded;
   an imaging device stored in the case in a curved state; and
   a sheet material supporting the imaging device,
   wherein the imaging device is slidably disposed with respect to the sheet material, and
   wherein the curved state is a state in which the imaging device is wound.

2. The digital camera according to claim 1, wherein the case includes:
   a signal processing unit that processes image data captured by the imaging device; and
   a memory that records the image data processed by the signal processing unit.

3. The digital camera according to claim 2, wherein the case includes a communicating unit that transmits the image data outside of the digital camera.

4. The digital camera according to claim 2, wherein the memory comprises a memory card provided detachably to the case.

5. The digital camera according to claim 1, wherein the case includes an operation switch.

6. The digital camera according to claim 5, wherein the operation switch comprises a power supply switch.

7. The digital camera according to claim 5, wherein the operation switch sets a loading direction of the case when the case is loaded into the film camera.

8. The digital camera according to claim 5, wherein the operation switch sets a winding direction of the imaging device.

9. The digital camera according to claim 1, wherein the case has an opening for extending and retracting the imaging device, the outlet having a cleaning mechanism for cleaning an imaging surface of the imaging device.

10. The digital camera according to claim 9, wherein the cleaning mechanism comprises silicon rubber or implanted hairs.

11. The digital camera according to claim 1, wherein the imaging device comprises:
    a flexible sheet;
    a pixel electrode layer;
    an opposing electrode layer;
    a photosensitive layer disposed between the pixel electrode layer and the opposing electrode layer;
    a signal reading unit to read a signal responding to a photoelectron generated by light entering into the photosensitive layer; and
    a flexibility enhancing unit that separates the photosensitive layer between pixels in a direction perpendicular to a sheet surface of the flexible sheet.

12. The digital camera according to claim 11, wherein the imaging device comprises a plurality of sets stacked, each of the sets including:
    the pixel electrode layer;
    the opposing electrode layer; and
    the photosensitive layer disposed between the pixel electrode layer and the opposing electrode layer, and
    wherein the photosensitive layer in one of the sets has a peak of a light receiving sensitivity in a wavelength range different from each photosensitive layer in the another of the sets.

13. The digital camera according to claim 11, wherein the imaging device has three sets stacked, each of the three sets including:
    the pixel electrode layer;
    the opposing electrode layer; and
    the photosensitive layer between the pixel electrode layer and the opposing electrode layer, and
    wherein a first one of the three sets has sensitivity to red-color light, a second one of the three sets has sensitivity to green-color light, and a third one of the three sets has sensitivity to blue-color light.

14. The digital camera according to claim 1, wherein the case comprises therein a shaft for winding the imaging device in conjunction with a rotating mechanism of the case.

15. The digital camera according to claim 14, wherein the shaft for winding the imaging device comprises the same shaft for winding a sheet material supporting the imaging device.

16. The digital camera according to claim 15, wherein the case comprises therein a shaft for winding a sheet material supporting the imaging device in conjunction with the rotating mechanism of the case, and the shaft for winding the imaging device is different from the shaft winding the sheet material.

17. The digital camera according to claim 14, wherein the imaging device is formed such that a cross section of the imaging device forms a shape of a trapezoid.

18. The digital camera according to claim 1, wherein a fitting groove is formed in the sheet material, and
wherein the imaging device is slidably disposed within the fitting groove.

19. The digital camera according to claim 18, wherein the fitting groove is formed such that a side wall of the fitting groove forms an acute angle.

20. The digital camera according to claim 18, wherein the fitting groove is formed such that the imaging device is slidably held at least partially within the fitting groove.

* * * * *